United States Patent
Ehara et al.

[11] Patent Number: 5,924,520
[45] Date of Patent: Jul. 20, 1999

[54] CABLE-TYPE STEERING DEVICE

[75] Inventors: Shigeki Ehara; Hiroshi Tabata, both of Saitama, Japan

[73] Assignee: Honda Giken Kogyo Kabushiki Kaisha, Tokyo, Japan

[21] Appl. No.: 08/987,383

[22] Filed: Dec. 9, 1997

[30] Foreign Application Priority Data

Dec. 10, 1996 [JP] Japan .................................. 8-329853

[51] Int. Cl.$^6$ ...................................................... B62D 5/04
[52] U.S. Cl. ........................................... 180/444; 280/771
[58] Field of Search .................................... 280/771, 774, 280/98; 74/492, 496, 505; 180/400, 428, 444, 404, 434

[56] References Cited

U.S. PATENT DOCUMENTS

| | | | |
|---|---|---|---|
| 3,747,428 | 7/1973 | Waner et al. | 74/496 |
| 4,449,420 | 5/1984 | Baba | 74/501 |
| 4,522,278 | 6/1985 | Kitagawa et al. | 180/79.1 |
| 5,065,325 | 11/1991 | Takahashi | 364/44.05 |
| 5,082,076 | 1/1992 | Oshita et al. | 180/79.1 |
| 5,699,874 | 12/1997 | Miyaurqa | 180/443 |

FOREIGN PATENT DOCUMENTS

8-2431  1/1996  Japan .

*Primary Examiner*—J J Swann
*Assistant Examiner*—James S. McClellan
*Attorney, Agent, or Firm*—Armstrong, Westerman, Hattori, McLeland, & Naughton

[57] ABSTRACT

In a cable-type steering device (in which a steering torque of a steering wheel is transmitted to wheels through a driven pulley, cables, and a follower pulley, and is assisted by a motor for a power-steering operation), a rotational angle of the driven pulley and a rotational angle of the follower pulley upon operation of the steering wheel are detected by potentiometers. A deviation between both of the rotational angles is proportional to an amount of elongation of the cables, i.e., the steering torque. Hence, an electronic control unit U controls the driving of the motor for the power-steering operation based on the deviation.

4 Claims, 6 Drawing Sheets

CABLE-TYPE STEERING DEVICE

BACKGROUND OF THE INVENTION

1. Field of the Invention

The present invention relates to a cable-type steering device in which a steering wheel and a gear box are connected to each other by a flexible cable such as a Bowden cable.

2. Description of Related Art

A conventional steering device for a vehicle is designed in such a manner that a steering shaft having a steering wheel at its upper end is connected at its lower end to a gear box, so that a steering torque inputted to the steering wheel is transmitted through the steering shaft to a rack and pinion mechanism mounted within the gear box.

However, if the steering wheel and the gear box are connected to each other using the steering shaft, it is difficult to freely select the position of the steering wheel relative to the position of the gear box. For this reason, there is encountered a problem that the degree of freedom in the design is substantially limited, and the gear box cannot be commonly used in a right-hand steered vehicle and a left-hand steered vehicle. Moreover, another problem is that the vibration inputted to a tire from a road surface and the vibration of an engine are inputted to the steering wheel through the steering shaft and hence, the silence within a vehicle compartment and the riding comfort are impeded by such vibrations.

Therefore, there is a proposed cable-type steering device which employs a flexible transmitting means such as a Bowden wire and line in place of the conventional steering shaft (see Japanese Patent Application Laid-open No.8-2431).

If the construction of the proposed cable-type steering device is used, the position of the steering wheel relative to the position of the gear box can be freely selected. Moreover, it will be difficult to transmit the vibration of the gear box to the steering wheel. Hence, the above-described problems can be solved.

A conventionally well-known electric power-steering device is designed so that a steering torque of a steering wheel is detected, and an output corresponding to the steering torque is generated by a motor for a power-steering operation to assist in the operation of the steering wheel performed by a driver. A torsion bar is incorporated in a path of transmission of the steering torque, and the detection of the steering torque is achieved by detecting an amount of torsion bar distorted due to the steering torque by a differential transformer.

However, because the conventional steering torque detecting means detects the steering torque based on the amount of torsion bar distorted, there is a problem in that the structure is complicated and the cost is increased. Also, the distortion of the torsion bar causes the steering rigidity to be decreased, thereby providing an adverse influence to the steering feeling.

SUMMARY OF THE INVENTION

The present invention has been accomplished in view of the above circumstances, and it is an object of the present invention to provide a cable-type steering device wherein a steering torque can be detected in a simple structure, while preventing a decrease in the steering rigidity.

To achieve the above object, according to the present invention, the operation of the steering wheel performed by a driver is transmitted to the wheels through a driven pulley, cables, a follower pulley and a steering gear box, while a power assisting means is operated based on a steering torque of the steering wheel detected by a steering torque detecting means to assist in the operation of the steering wheel performed by the driver. An amount of elongation of the cables is varied depending upon a magnitude of the steering torque inputted to the steering wheel. Hence, a deviation between a rotational angle of the driven pulley and a rotational angle of the follower pulley is varied depending upon the magnitude of the steering torque. The steering torque is calculated from the deviation between the rotational angle of the driven pulley and the rotational angle of the follower pulley by the steering torque detecting means, and the operation of the power assisting means is controlled in accordance with such steering torque. Thus, the operation of the power assisting means can be properly controlled in a simple structure in which outputs from two rotational angle detecting means detecting the rotational angle are only compared with each other. Moreover, because it is unnecessary to provide a torsion bar in a path of transmission of the steering torque, a reduction in steering rigidity due to the distortion of the torsion bar can be avoided.

According to another aspect of the present invention, if the driven pulley and/or the follower pulley or a rotary shaft thereof is rotated, such rotation is transmitted to a driven pulley rotational-angle detecting means and/or a follower pulley rotational-angle detecting means through gear means, and the rotational angle is detected. The use of the gear means ensures that the driven pulley rotational-angle detecting means and/or the follower pulley rotational-angle detecting means can be disposed at any location relative to the driven pulley and/or the follower pulley to increase the degree of freedom in the layout.

According to yet another aspect of the present invention, if the driven pulley and/or the follower pulley is rotated, such rotation is transmitted directly to the driven pulley rotational-angle detecting means and/or the follower pulley rotational-angle detecting means, and the rotational angle is detected. Since the driven pulley rotational-angle detecting means and/or the follower pulley rotational-angle detecting means are connected directly to the driven pulley and/or the follower pulley or the rotary shaft(s) thereof, it is possible to reduce the number of parts for connecting the driven pulley rotational-angle detecting means and/or the follower pulley rotational-angle detecting means directly to the driven pulley and/or the follower pulley or the rotary shaft(s) thereof.

According to a further aspect of the present invention, if the deviation between the rotational angles of the pulleys exceeds a preset reference value, a warning means emits a warning. Therefore, the elongation of the cables can be detected to forewarn the driver to regulate the tension of the cables and to replace the cables.

BRIEF DESCRIPTION OF THE DRAWINGS

The foregoing and other objects, features and advantages of the present invention will become apparent from the following description of the preferred embodiments to be made with reference to the accompanying drawings, of which.

DETAILED DESCRIPTION OF THE PREFERRED EMBODIMENTS

The best mode for carrying out the present invention will now be described by way of preferred embodiments with reference to the accompanying drawings.

Figure 1:
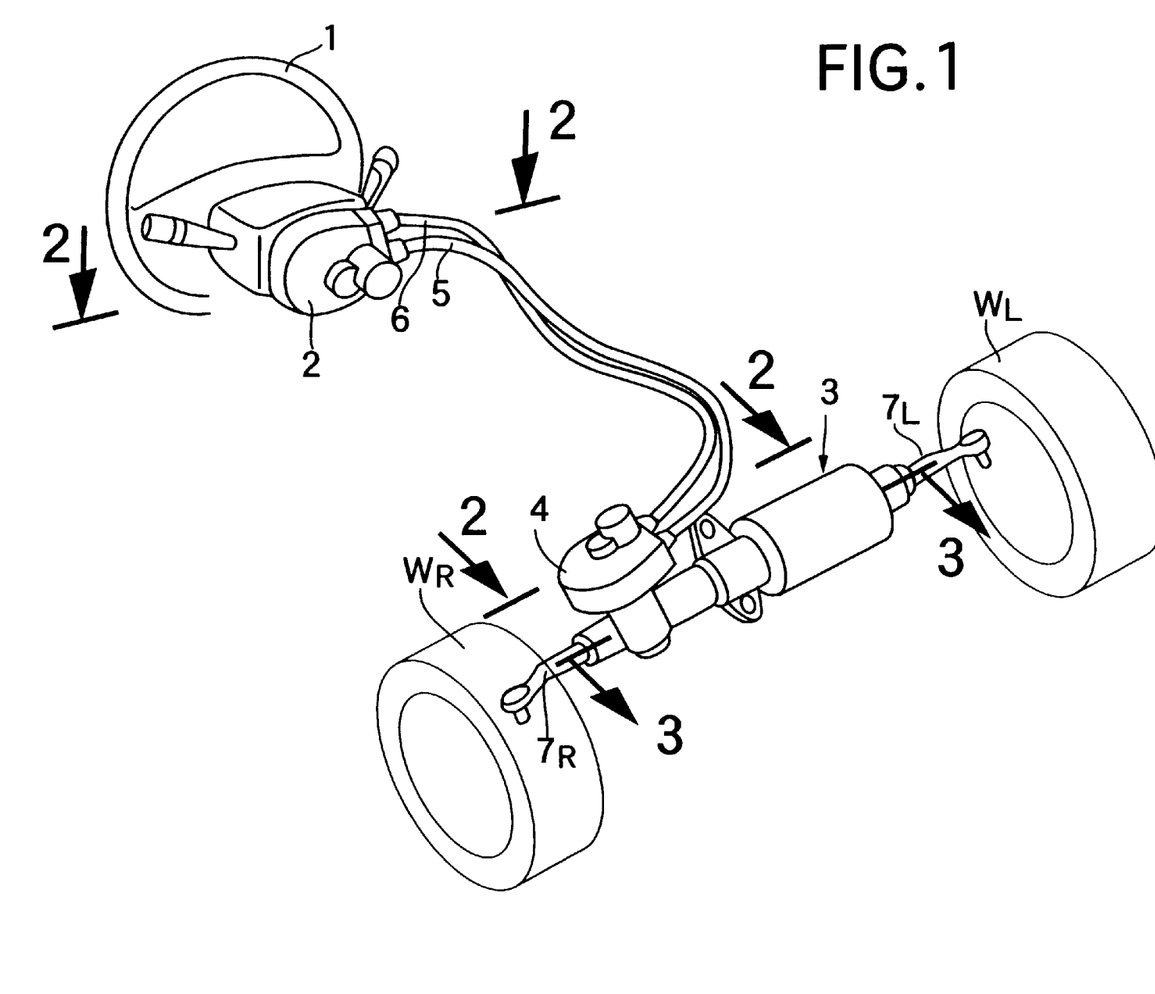
FIG. 1 is a perspective view of an arrangement of a steering device for a vehicle according to a preferred embodiment of the present invention.

As shown in FIG. 1, a driven pulley housing 2 mounted in front of a steering wheel 1 of a vehicle and a follower pulley housing 4 mounted on a gear box 3 are connected to each other by two Bowden wires 5 and 6. Tie rods $7_L$ and $7_R$ extending laterally of a vehicle body from opposite ends of the gear box 3 are connected to knuckles (not shown) for supporting left and right wheels $W_L$ and $W_R$.

Figure 2:
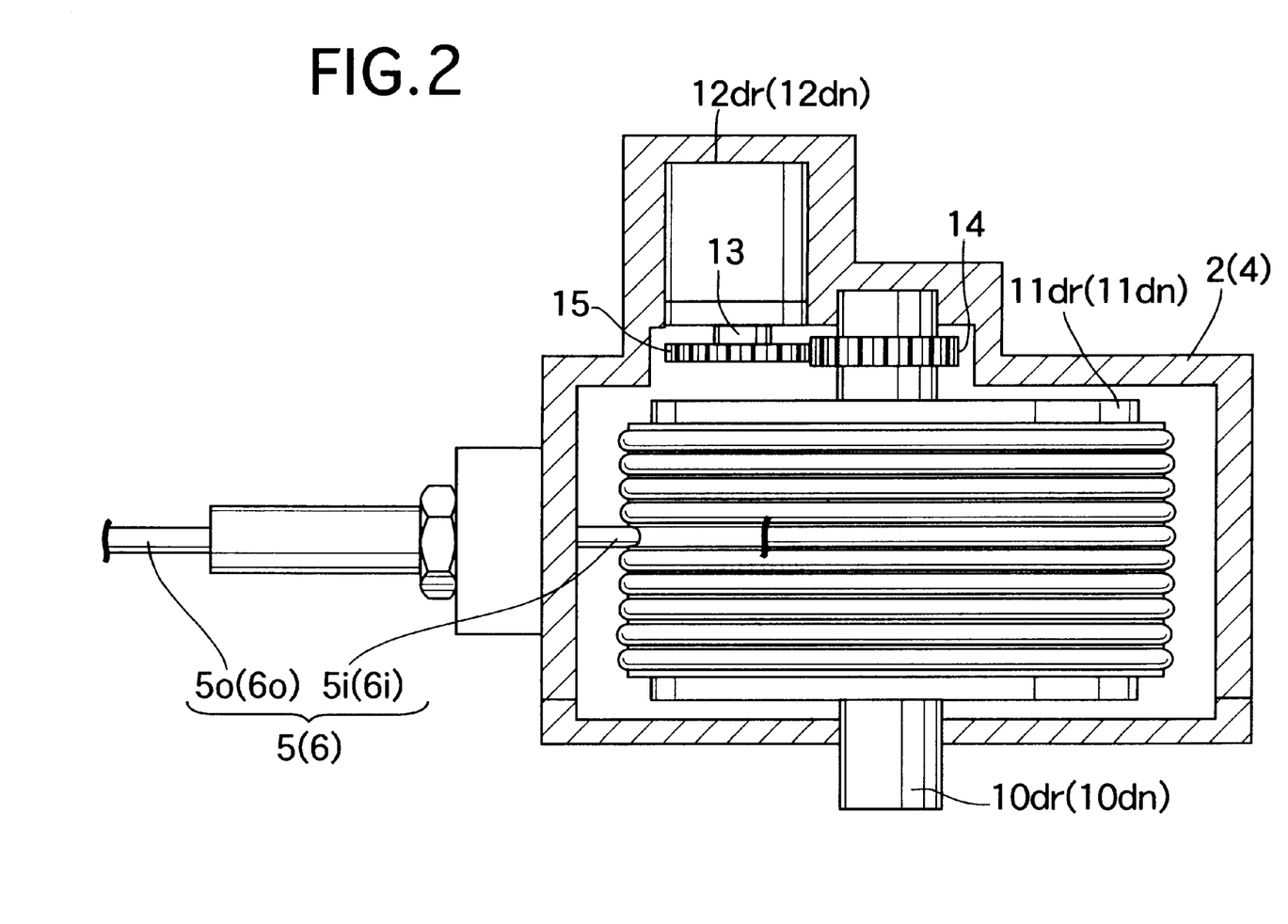
FIG. 2 is an enlarged sectional view taken along a line 2–2 in FIG. 1.

As shown in FIG. 2, a driven pulley 11dr is secured to a rotary shaft 10dr which is rotatably supported in the driven pulley housing 2 and rotated along with the steering wheel 1. A follower pulley 11dn is fixed to a rotary shaft 10dn which is rotatably supported in the follower pulley housing 4. Each of the Bowden wires 5 and 6 includes an outer tube 5o, 6o and an inner cable 5i, 6i slidably accommodated in the outer tube 5o, 6o. Opposite ends of the inner cables 5i and 6i are wound in a plurality of turns around spiral pulley grooves defined around outer peripheries of the driven pulley 11dr and the follower pulley 11dn to be secured thereto, while opposite ends of the outer tubes 5o and 6o are supported on the driven pulley housing 2 and the follower pulley housing 4.

The driven pulley housing 2 and the follower pulley housing 4 are provided with potentiometers 12dr and 12dn as rotational angle detecting means, respectively. A driven gear 14 fixed respectively to the rotary shafts 10dr and 10dn of the driven pulley 11dr and the follower pulley 11dn is meshed with a follower gear 15 fixed to rotary shafts 13 of the potentiometers 12dr and 12dn, so that the rotational angles of the driven pulley 11dr and the follower pulley 11dn are detected by the corresponding potentiometers 12dr and 12dn, respectively.

Figure 3:
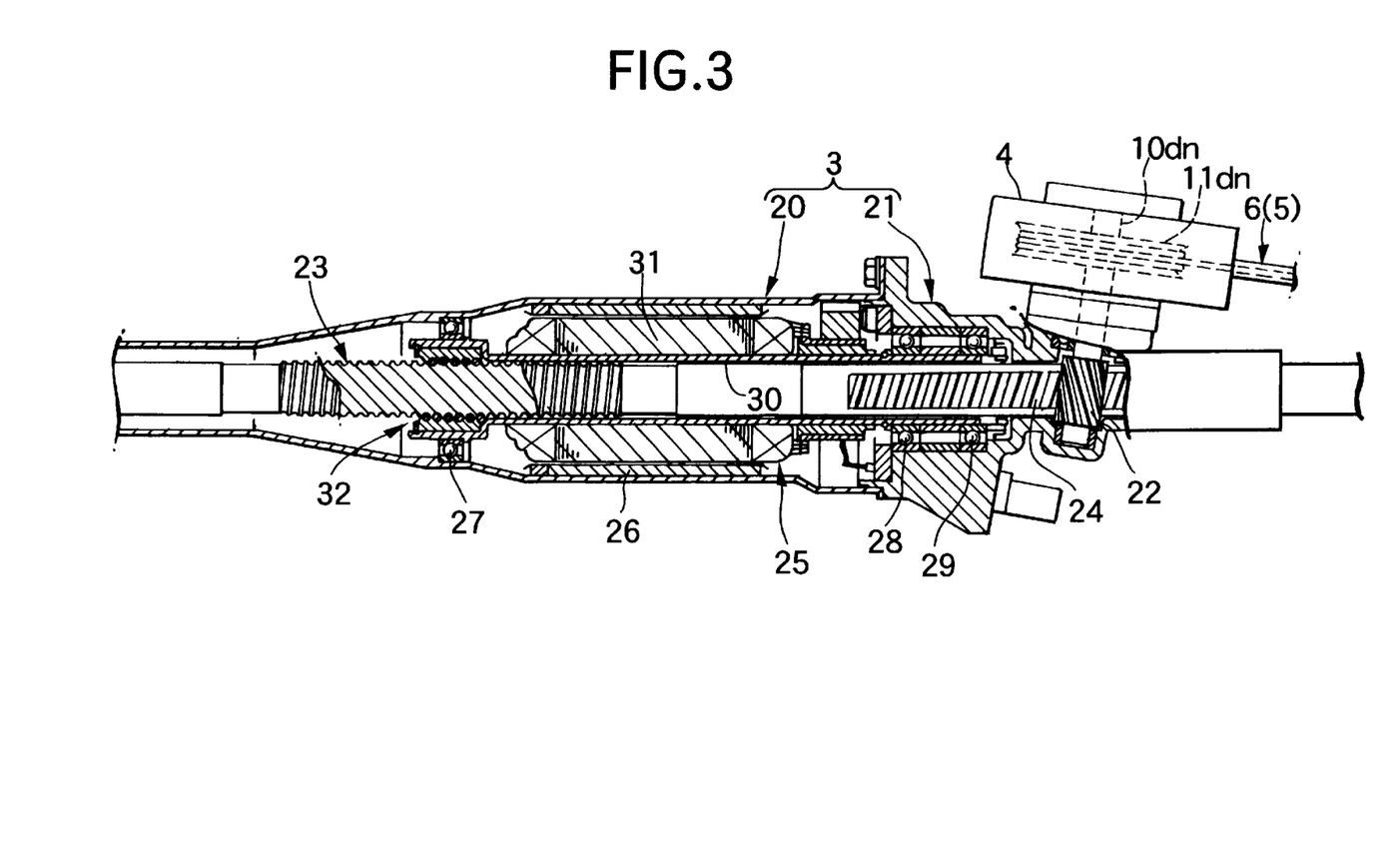
FIG. 3 is an enlarged sectional view taken along a line 3–3 in FIG. 1.

As shown in FIG. 3, the gear box 3 is divided into a left motor accommodating chamber 20 and a right rack and pinion accommodating chamber 21, and the follower pulley housing 4 is supported on the rack and pinion accommodating chamber 21. The rotary shaft 10dn integral with the follower pulley 11dn mounted in the follower pulley housing 4 extends into the rack and pinion accommodating chamber 21, and a pinion 22 is secured to such extension. A steering rod 23 connected at its opposite ends to the tie rods $7_L$ and $7_R$ is laterally slidably supported within the gear box 3, and the pinion 22 is meshed with a rack 24 formed on the steering rod 23.

A motor 25 for a power-steering operation accommodated in the motor accommodating chamber 20 in the gear box 3 includes a stator 26 secured to an inner peripheral surface of the motor accommodating chamber 20, a motor output shaft 30 rotatably supported on the inner peripheral surface of the motor accommodating chamber 20 through three ball bearings 27, 28 and 29, and fitted over an outer periphery of the steering rod 23, and a rotor 31 secured to the motor output shaft 30 and opposed to the stator 26. A ball screw mechanism 32 is interposed between an inner peripheral surface of the motor output shaft 30 and an outer peripheral surface of the steering rod 23, so that a steerage assisting force for laterally reciprocating the steering rod 23 can be generated by driving the motor 25 for the power-steering operation to rotate the motor output shaft 30 in opposite directions.

Figure 4:
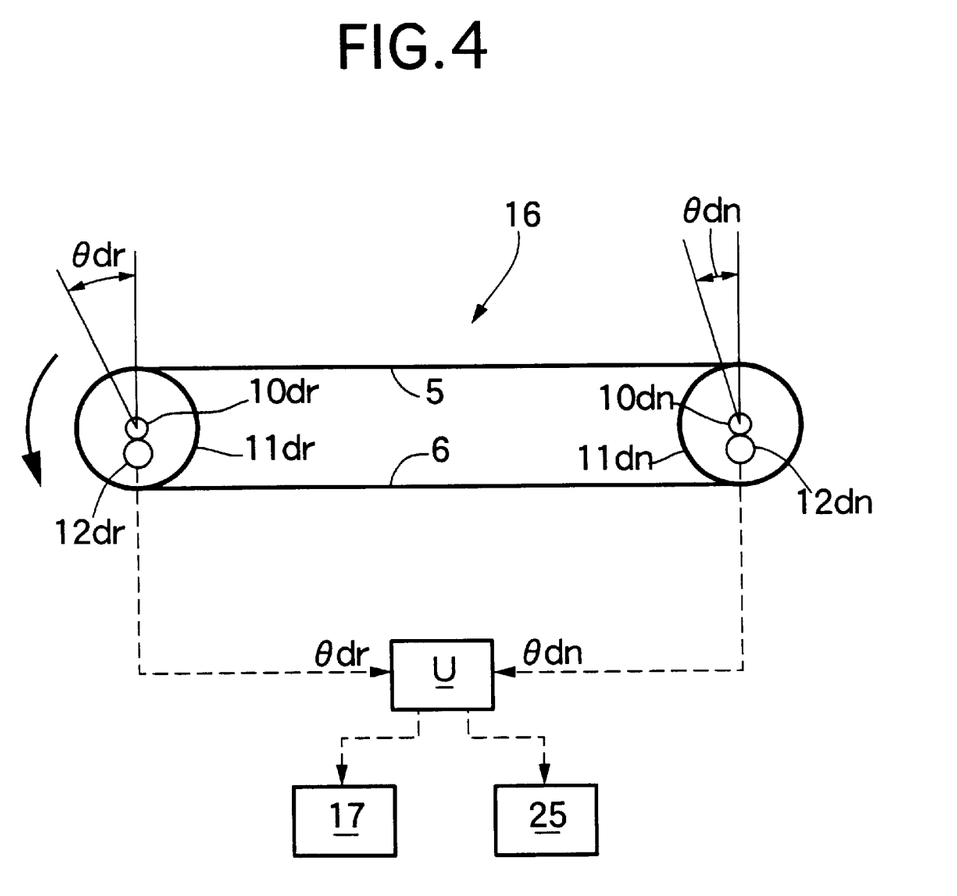
FIG. 4 is an illustration of a steering torque detecting means.

FIG. 4 illustrates a construction of the steering torque detecting means 16. A rotational angle $\theta dr$ of the driven pulley 11dr detected by the potentiometer 12dr and a rotational angle $\theta dn$ of the follower pulley 11dn detected by the potentiometer 12dn are inputted to an electronic control unit U as a steering torque calculating means. The electronic control unit U controls the driving of the motor 25 for the power-steering operation based on these rotational angles $\theta dr$ and $\theta dn$. A warning means 17 such as a lamp, a buzzer, a chime and the like for giving a warning to a driver is connected to the electronic control unit U.

The operation of the embodiment of the present invention having the above-described arrangement will be described below.

If the steering wheel 1 is operated to turn the vehicle, the rotary shaft 10dr is rotated along with the driven pulley 11dr in FIG. 4. As a result, the inner cable 5i, 6i of one of the Bowden wires 5 and 6 is pulled, and the other inner cable 5i, 6i is loosened. This causes the rotation of the driven pulley 11dr to be transmitted to the follower pulley 11dn to rotate the rotary shaft 10dn, so that a steering torque is transmitted to the wheels $W_L$ and $W_R$ through the pinion 22 and the rack 24 within the gear box 3 shown in FIG. 3.

At this time, the rotational angle $\theta dr$ of the driven pulley 11dr and the rotational angle $\theta dn$ of the follower pulley 11dn are detected by the potentiometers 12dr and 12dn, respectively and inputted to the electronic control unit U. When the steering torque inputted to the steering wheel 1 is smaller, the tension applied to the Bowden wires 5 and 6 is smaller and hence, the elongation of the Bowden wires 5 and 6 by the tension is smaller. Reversely, when the steering torque inputted to the steering wheel 1 is larger, the elongation of the Bowden wires 5 and 6 is larger.

Provided that the elongation of the Bowden wires 5 and 6 is zero, the rotational angle $\theta dr$ of the driven pulley 11dr and the rotational angle $\theta dn$ of the follower pulley 11dn are equal to each other, but the rotational angle $\theta dn$ of the follower pulley 11dn is decreased relative to the rotational angle $\theta dr$ of the driven pulley 11dr in accordance with an increase in elongation of the Bowden wires 5 and 6. Namely, if a deviation $\Delta\theta = \theta dr - \theta dn$ between the rotational angle $\theta dr$ of the driven pulley 11dr and the rotational angle $\theta dn$ of the follower pulley 11dn is calculated, it follows that the deviation $\Delta\theta$ is proportional to the steering torque inputted to the steering wheel 1.

Thus, by controlling the operation of the motor 25 for the power-steering operation based on the deviation $\Delta\theta$ by the electronic control unit U, the steering rod 23 is driven laterally, to steer the wheels $W_L$ and $W_R$ laterally, thereby assisting the operation of the steering wheel 1 carried out by the driver. The electronic control unit U monitors the deviation $\Delta\theta$, and when the deviation $\Delta\theta$ has exceeded a preset reference value, it is determined that the amount of elongation of the Bowden wires 5 and 6 has been increased, and the warning means 17 is operated. Thus, it is possible to forewarn the driver to regulate the tension of the Bowden wires 5 and 6 or to replace the Bowden wires 5 and 6, thereby ensuring reliable steering over a long time.

Even if the Bowden wires 5 and 6 should brake, the deviation Δθ exceeds the preset reference value and hence, the warning means 17 is operated, thereby warning the driver to repair the broken Bowden wires 5 and 6. In this case, as long as the potentiometer 12dr detects the rotational angle θdr of the driven pulley 11dr, the steering function can be ensured by controlling the driving of the motor 25 for the power-steering operation based on such rotational angle θdr. In a case where the steering is carried out by driving the motor 25 for the power-steering operation upon the breaking of the Bowden wires 5 and 6, it is possible to allow the driver to reliably perceive the fact that the Bowden wires 5 and 6 have been broken, by making the steering feeling different from that in the usual case.

Even if the driving of the motor 25 for the power-steering operation is made impossible due to a failure of the control system, the steering torque applied to the steering wheel 1 by the driver is transmitted via the driven pulley 11dr, the Bowden wires 5 and 6, the follower pulley 11dn and the gear box 3 to the wheels $W_L$ and $W_R$ and hence, a manual steering function can be ensured.

As described above, according to the embodiment of the present invention, it is possible to easily and reliably detect the steering torque of the steering wheel 1 by a simple structure including only the two mounted potentiometers 12dr and 12dn. Moreover, it is unnecessary to mount a torsion bar in a path of transmission of the steering torque in order to detect the steering torque and therefore, a reduction in steering rigidity due to the distortion of the torsion bar can be avoided to enhance the steering feeling.

Figure 6:
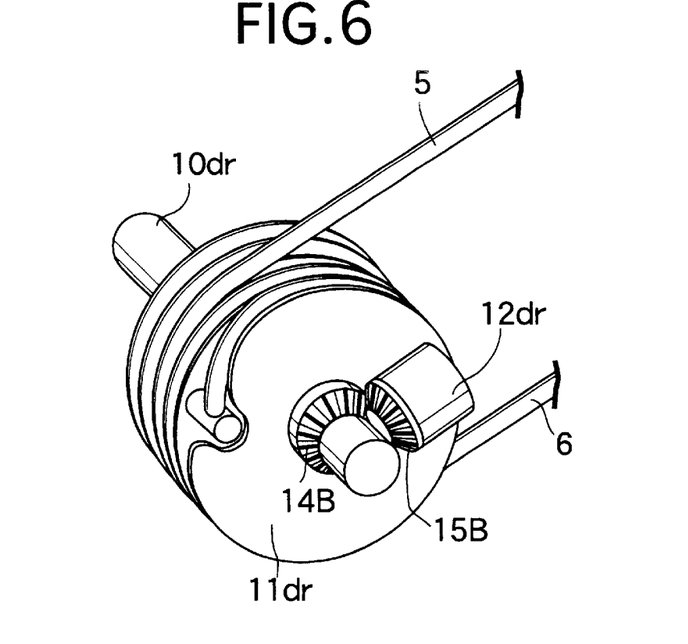
FIG. 6 is a perspective view of a pulley according to a third embodiment of the present invention.
Figure 7:
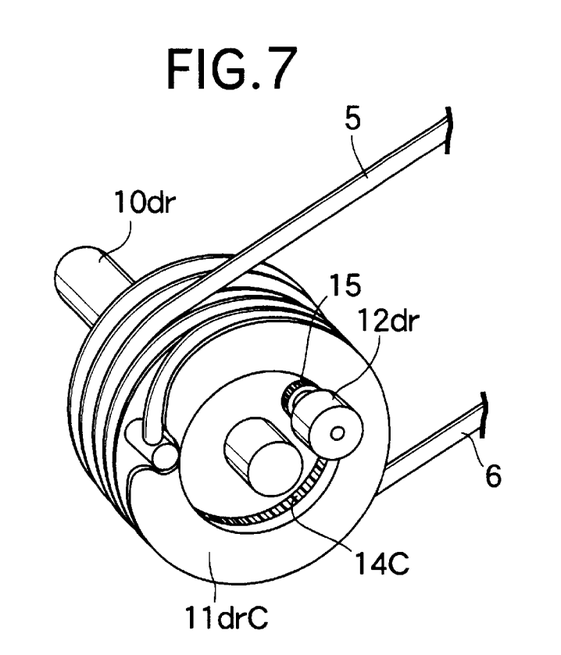
FIG. 7 is a perspective view of a pulley according to a fourth embodiment of the present invention.

Second to fourth embodiments of the present invention will be described below with reference to FIGS. 5 to 7.

Figure 5:
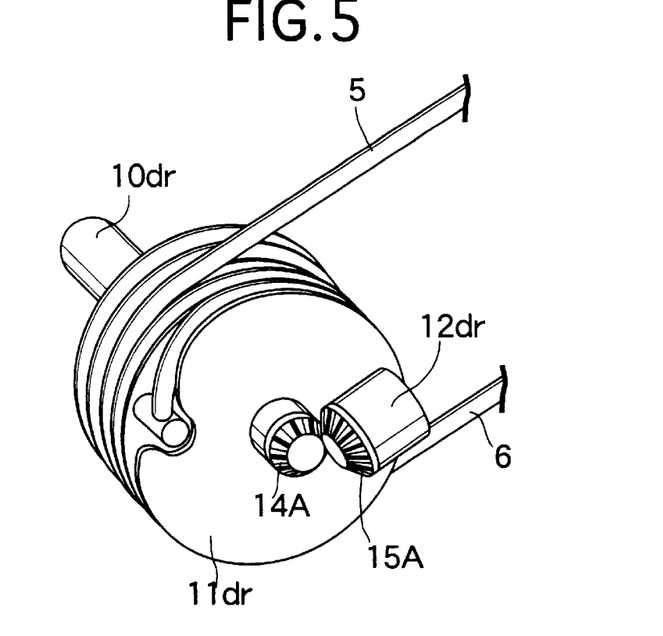
FIG. 5 is a perspective view of a pulley according to a second embodiment of the present invention.

In the second embodiment shown in FIG. 5, a driven gear 14A comprised of a bevel gear integrally formed at an end of the rotary shaft 10dr is meshed with a follower gear 15A comprised of a bevel gear provided on the potentiometer 12dr. In the third embodiment shown in FIG. 6, a driven gear 14B comprised of a bevel gear integrally formed on a side of the driven pulley 11dr to surround the rotary shaft 10dr is meshed with a follower gear 15B comprised of a bevel gear provided on the potentiometer 12dr. In the fourth embodiment shown in FIG. 7, a driven gear 14C comprised of a ring gear formed on a side of a driven pulley 11drC is meshed with the follower gear 15 provided on the potentiometer 12dr. In a similar structure as that described above in the second to fifth embodiments, the rotation of the follower pulley 11dn (including a structure similar to the driven pulley 11drC) is also transmitted to the potentiometer 12dn on the side of the follower pulley 11dn.

By the fact that the rotation of the driven pulley 11dr (including the driven pulley 11drC in FIG. 7) or the follower pulley 11dn (including one corresponding to the driven pulley 11drC) is transmitted to the potentiometers 12dr and 12dn through the gears 14, 14A–C, 15, and 15A–B, as in the first to fifth embodiments, the potentiometers 12dr and 12dn can be disposed at any location to increase the degree of freedom of the layout.

Figure 8:
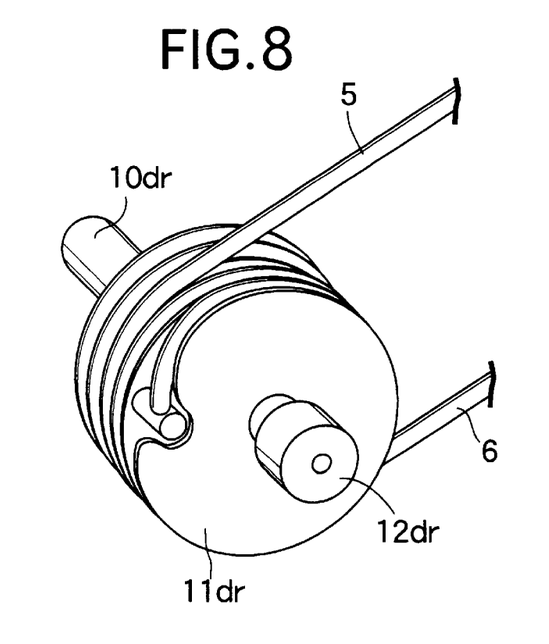
FIG. 8 is a perspective view of a pulley according to a fifth embodiment of the present invention.

In a sixth embodiment shown in FIG. 8, the potentiometer 12dr is connected directly to an end of the rotary shaft 10dr of the driven pulley 11dr, and the same structure can be employed even on the side of the follower pulley 11dn. According to the sixth embodiment, it is possible to decrease the number of parts for connecting the potentiometers 12dr and 12dn to the driven pulley 11dr or the follower pulley 11dn.

Although the embodiments of the present invention have been described in detail, it will be understood that the present invention is not limited to the above-described embodiments, and various modifications may be made without departing from the subject matter of the invention.

For example, although the potentiometers 12dr and 12dn have been used as the rotational angle detecting means in the embodiments, a rotary encoder may be used in place of the potentiometers. In addition, the structure of attachment of the potentiometer 12dr to the driven pulley 11dr and the structure of attachment of the potentiometer 12dn to the follower pulley 11dn need not be necessarily the same.

As discussed above, according to the present invention, the steering torque detecting means includes the driven pulley rotational-angle detecting means for detecting the rotational angle of the driven pulley, the follower pulley rotational-angle detecting means for detecting the rotational angle of the follower pulley, and the steering torque calculating means for calculating the steering torque based on the deviation between the rotational angles of both the pulleys. Thus, in the simple structure in which only the outputs from the two rotational angle detecting means are compared with each other, the steering torque of the steering wheel can be reliably detected, and the operation of the power assisting means can be properly controlled. Moreover, because it is unnecessary to provide the torsion bar in the path of transmission of the steering torque, the reduction in steering rigidity due to the distortion of the torsion bar can be avoided to enhance the steering feeling.

According to another aspect of the present invention, the driven pulley rotational-angle detecting means and/or the follower pulley rotational-angle detecting means is connected to the driven pulley and/or the follower pulley or the rotary shaft(s) thereof through the gear to detect the rotational angle. Therefore, the driven pulley rotational-angle detecting means and/or the follower pulley rotational-angle detecting means can be disposed at any location relative to the driven pulley and/or the follower pulley to increase the degree of freedom of the layout.

According to yet another aspect of the present invention, the driven pulley rotational-angle detecting means and/or the follower pulley rotational-angle detecting means is connected directly to the driven pulley and/or follower pulley of the rotary shaft thereof to detect the rotational angle. Therefore, it is possible to reduce the number of parts for connecting the driven pulley rotational-angle detecting means and/or the follower pulley rotational-angle detecting means are connected directly to the driven pulley and/or the follower pulley.

According to a further aspect of the present invention, by including the warning means for emitting the warning when the deviation between the rotational angles of the pulleys exceeds the preset reference value, the elongation of the cables can be detected to forewarn the driver to regulate of the tension of the cables and to replace the cables.

What is claimed is:

1. A cable-type steering device, comprising:
   a driven pulley connected to a steering wheel and being rotatable;
   a follower pulley connected to a gear box for steering wheels and being rotatable, said driven pulley and said follower pulley being connected to each other by cables;
   a steering torque detecting means for detecting a steering torque inputted to the steering wheel and transmitted to the gear box through the cables; and
   a power-steering means operated based on the steering torque detected by said steering torque detecting means, said steering torque detecting means including:
- a driven pulley rotational-angle detecting means for detecting a rotational angle of said driven pulley;
- a follower pulley rotational-angle detecting means for detecting a rotational angle of said follower pulley; and
- a steering torque calculating means for calculating the steering torque based on a deviation between the rotational angles of both of said pulleys.

2. A cable-type steering device according to claim 1, wherein at least one of said driven pulley rotational-angle detecting means and said follower pulley rotational-angle detecting means is connected to at least a corresponding one of said driven pulley, said follower pulley, and a rotary shaft of either said driven pulley or said follower pulley through gear means to detect said rotational angle.

3. A cable-type steering device according to claim 1, wherein at least one of said driven pulley rotational-angle detecting means and said follower pulley rotational-angle detecting means is connected directly to at least a corresponding one of said driven pulley, said follower pulley, and a rotary shaft of either said driven pulley or said follower pulley to detect said rotational angle.

4. A cable-type steering device according to claim 1, further comprising a warning means for emitting a warning when the deviation between the rotational angles of both of said pulleys exceeds a preset reference value.

* * * * *